United States Patent [19]

Blaurock

[11] Patent Number: 4,778,041
[45] Date of Patent: Oct. 18, 1988

[54] ROLLING MEMBER

[75] Inventor: Günter Blaurock, Niederwerrn, Fed. Rep. of Germany

[73] Assignee: Deutsche Star GmbH, Schweinfurt, Fed. Rep. of Germany

[21] Appl. No.: 932,659

[22] Filed: Nov. 19, 1986

[30] Foreign Application Priority Data

Nov. 19, 1985 [DE] Fed. Rep. of Germany ....... 3541020

[51] Int. Cl.$^4$ .................................... B65G 13/00
[52] U.S. Cl. ................................... 193/35 MD; 16/26
[58] Field of Search ............... 193/35 MD; 403/407.1, 403/406.1; 16/24–26

[56] References Cited

U.S. PATENT DOCUMENTS

| 877,948 | 2/1908 | Rand | 16/24 X |
|---|---|---|---|
| 2,931,477 | 4/1960 | Metzgar | 193/35 MD |
| 3,096,536 | 7/1963 | Rabelos | 16/24 X |
| 3,466,697 | 9/1969 | Cain et al. | 16/26 |
| 4,089,614 | 5/1978 | Harley | 403/407.1 |
| 4,382,637 | 5/1983 | Blackburn et al. | 16/25 X |
| 4,689,847 | 9/1987 | Huber | 16/26 |
| 4,696,583 | 9/1987 | Gorges | 16/26 X |

FOREIGN PATENT DOCUMENTS

| 172760 | 10/1952 | Austria . | |
|---|---|---|---|
| 2213021 | 9/1972 | Fed. Rep. of Germany . | |
| 2302075 | 7/1974 | Fed. Rep. of Germany | 16/25 |
| 2409272 | 9/1974 | Fed. Rep. of Germany | 403/406 |
| 1297185 | 5/1961 | France . | |

OTHER PUBLICATIONS

Pamphlet by Rehberg GmbH entitled "Kugelrollen Typ RE" (RE Type Ball Rollers).

Primary Examiner—Galen Barefoot
Assistant Examiner—James M. Kannofsky
Attorney, Agent, or Firm—Toren, McGeady & Associates

[57] ABSTRACT

A rolling support device or ball roller comprises a main ball housed in a casing comprising a substantially hemispherical bearing bush, an outer shell and a retaining ring assembly connected to the outer shell to retain the main ball and the bearing bush therein with a portion of the ball exposed through the ring to contact a member to be supported thereby; the outer shell is shaped to be received in an opening in a supporting member and the retaining ring defines a shoulder determining the limit of insertion; resilient tongues projecting from the casing act to retain the device in such an opening, for which purpose the tongues have an elbow portion each provided with at least one radially outwardly projecting tooth for biting into the side wall of an opening receiving the device to resist withdrawal thereof.

15 Claims, 3 Drawing Sheets

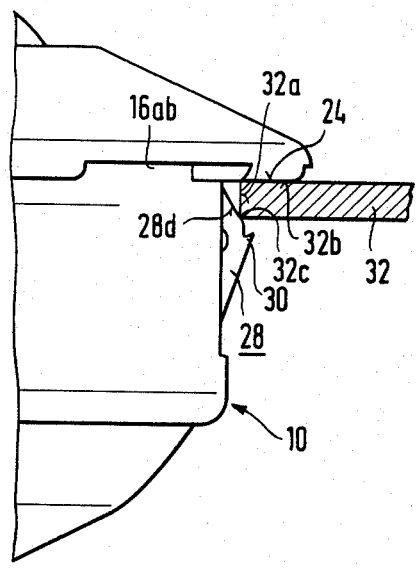
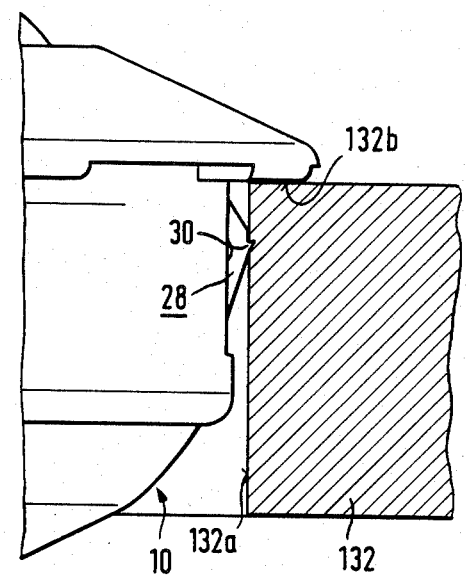
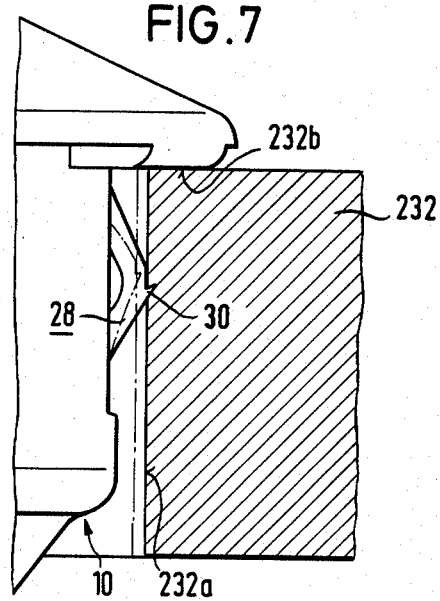

ROLLING MEMBER

BACKGROUND OF THE INVENTION

The present invention relates to a rolling support member of a type used for supporting a wide range of items for motion over a support surface. Known rolling support members of this type comprise an outer casing within which is housed a main ball a part of which projects from the casing. In use of such rolling support members the outer casing is fitted into a hole or socket of a support surface in such a way that the projecting part of the main ball is exposed to form a rollable bearing for rolling support of items moving over the support surface. Usually a plurality of such rolling support members are located over the support surface to form a roller plane.

The casing has an axis of symmetry which is usually orthogonal to the support surface when the rolling support member is fitted thereto. The casing is usually formed in two main parts, one of which is received in the socket or hole in the support surface and the other of which defines a shoulder which overlies the edge region surrounding the hole or socket in the support surface and also acts to retain the main ball in the casing. Of course, such rolling support members may alternatively be fitted into an under surface of a body to be carried rollingly on a support surface instead of the other way around as described above.

To retain the casing in the hole or socket in which the member is fitted it is usual to provide resilient tongues on the part of the casing received in the hole or socket.

Rolling members of this type are particularly suitable for conveying items of the most varied types and make it possible to achieve with ease movements of the load in different directions of movement.

To support the main ball in the casing subsidiary balls may be provided between the main ball and a partly spherical bearing surface of the casing.

One known rolling support device of this general type is described in DE-AS No. 22 13 021, in which a releasable interlock device is provided for securing the casing in an opening in a supporting member. The interlock device consists of opposed bolts supported slidably in bores, running at right angles to the axis of symmetry of the rolling support device, on the ends of which bolts act return springs which press the bolts outwards and into engagement with ribs in the opening. The disadvantages of this arrangement are on the one hand the costly and expensive production of the interlock device and on the other hand the fact that the supporting member must have a certain minimum thickness in order to obtain adequate engagement of such bolts. If the supporting member is made of thicker material the opening has to be of special form, so that this type of rolling support device cannot easily be used on all types of supporting member.

Another known rolling support device of this type is described in a pamphlet issued by Rehberg GmbH and entitled "Kugelrollen Typ RE" ("RE type ball rollers"). This device is held in an opening in the supporting member by two spring strips carried by the casing and inclined in the radial direction, relative to the axis of symmetry, towards two opposite points of the casing and fastened to the bottom of the casing or to the walls thereof. When this rolling support device is installed, the spring strips each generate a force at right angles to the axis of symmetry of the device, which acts on the inner surface of the opening in which it is received and thereby frictionally resists withdrawal of the device from the opening. At the same time an additional force can arise which results from the further deformation of the spring strips which occurs when an attempt is made to remove the rolling support device. The force required to remove the rolling support device thus has to overcome the sum of these two forces When the rolling support device is removed from the opening in which it is received this has to be effected by acting from the edge area of the support device by leverage. The disadvantage of this construction is that a secure seating of the device in the supporting member, together with the ability to remove the device without undue difficulty is only obtained for a certain, narrowly defined range of material thickness of the supporting member. If the supporting member is a thin panel the spring strips can snap back to their original length after installation of the rolling support device. The consequences of this are as follows: first the springs no longer exert a radially acting force on the side walls of the opening as a result of this springing back, and the rolling support device thus sits loosely in the opening, merely being held more or less loosely by the ends of the spring strips resting against the rear face of the panel constituting the supporting member. A firm seating therefore no longer exists. With an unfavourable form of spring strip, that is if the strip is relatively long requiring a large degree of deflection, (or looked at another way, if the opening is relatively small) it may even be the case that dismantling of the rolling member is no longer possible without damaging the edge area of the opening in the supporting member, because the ends of the spring strips jam against the rear face of the supporting panel and cannot be deflected inwardly merely by levering up the device from the front face of the panel. On the other hand, if the panel is thicker, and the opening is a relatively narrow bore, the spring strips are pressed very strongly together in this bore, so that deflection practically disappears. As a result, no deformation force arises when withdrawal is attempted. The retaining force thereby becomes dependent mrrely on friction and thus correspondingly low.

Another known rolling support device of this type is discussed in French Patent No. 12 97 185: this device can be held in a receiving opening by a spring locking ring. The disadvantage of this design is that secure retention of the device is only obtained when the supporting member is a sheet or panel of a certain gauge. If the gauge of the panel or sheet is greater than the distance between the face of the device which bears against the panel or sheet and the locking ring, only frictional resistance exists between the device and the opening receiving it. If the panel or sheet is thinner than the bearing face/locking ring separation no axial fixing exists and the device can thus move axially within the bore. If the panel or sheet thickness does correspond to the separation between the bearing face and the locking ring, or is smaller than it, another disadvantage arises in that the device cannot be levered out of the receiving bore without the spring ring first being pressed together.

OBJECTS OF THE INVENTION

A primary object of the present invention is that of providing a rolling support device which can be received securely in openings having a wide range of diameters.

Another object of the invention is to provide a rolling support device which can be securely fitted in an opening of any depth.

A further object of the invention is to provide a rolling support device which can be removed from an opening in a supporting member by levering only from the front face of the supporting member from which the roller ball of the rolling support device projects.

SUMMARY OF THE INVENTION

According to the present invention there is provided a rolling support device comprising:

a main ball for rolling support of a supported member, a casing within which said main ball is rollingly housed, means retaining said main ball within said casing with a portion of said ball exposed to make rolling contact with said supported member, means defining a first casing part shaped for insertion into an opening in a supporting member and being substantially symmetrical about an axis of symmetry having an outer pole where it intersects said exposed portion of said main ball and an inner pole where it intersects said surface of said main ball diametrically opposite said outer pole, means defining a shoulder portion of said casing surrounding said first casing part and facing away from said outer pole of said axis of symmetry whereby to contact an edge area surrounding a said opening in said supporting member when said first casing part is inserted therein, and resilient tongues projecting from said first casing part for engagement with side walls of said opening in said supporting member when said first casing part is inserted therein, having the improvement wherein:

said resilient tongues have a first limb portion, a second limb portion and an elbow portion between said first limb portion and said second limb portion, said elbow portion being directed radially outwardly of said first casing part with respect to said axis of symmetry thereof, means securing said first limb portions of said resilient tongues to said casing and tooth means on said elbow portion of each said resilient tongue, said tooth means engaging said side walls of a said opening in a supporting member when said first casing part is introduced therein.

The tooth or teeth can dig into the wall of an opening receiving the device under the force exerted by the resilient tongues which are forced radially inwards upon insertion of the device into the opening, whereby to ensure a firm connection. In this way a large retaining force can be obtained even when the supporting member is thick and the opening therein for receiving devices of the invention are thus in the form of bores. Moreover, if the supporting member is made of relatively soft material, such a wood or plastics, the positive gripping of the teeth is particularly firm, which is an added advantage.

The teeth may be of an asymmetric shape so that they offer less resistance to insertion into an opening or bore than to removal therefrom.

The size and shape of the teeth may of course be specifically adapted to the material of the supporting member; in other words small teeth can be used if metal supporting members are expected, such teeth having a shape corresponding approximately to the shape of the teeth of a metal saw, whereby larger teeth can be used when it is expected that the supporting member will consist of wood, plastics or wood fibre material, in which case the teeth will have a shape corresponding approximately to the shape of the teeth of a wood saw. It is conceivable, moreover, that a compromise could be reached to obtain a tooth shape of universal applicability, in which case an intermediate shape may be designed following simple preliminary tests.

One advantage of the present invention is that by using resilient tongues having an outwardly directed elbow the free end of the tongue is closer to the axis of symmetry than the outwardly directed elbow, which means there is much less risk than hithertofore that the free end of the tongue may jam against the edge region of a smaller-than-normal hole in a thin panel thereby preventing removal from the front face of the panel, which is often the only convenient way of removing such devices for maintenance or replacement. This can be made even more certain by making the length of the tongue such that when it is flexed inwardly towards the axis of symmetry by its maximum extent the free end comes up closely against the shoulder surrounding the part of the casing inserted into the opening. Security against extraction is ensured, in the case of a thick supporting member by the engagement of the tooth or teeth of the tongues against the side wall of the opening and, in the case of a thin supporting member, by the interaction of the inclined face of the second limb of the tongue and the edge of the opening remote from the front face. In any case, release of the rolling support device is possible merely by overcoming the engagement of the teeth with the side walls of the opening, and this can be achieved by pressing the tongue inwardly using a suitable tool.

The teeth can be formed by stamping the material of the tongues. To this end the tongues may be made of steel, optionally hardened steel, for example spring steel. The teeth may, however, also be formed by stamping out and bending an end of the respective tongue.

To protect the tongues these can be partially received in a receiving slot on the outside of the casing remote from the external pole of the axis of symmetry and be spring-loaded or otherwise fixed therein.

Within the casing there may be a bearing bush defining the housing for the main ball, in which case the ball is retained in the casing by a retaining ring arrangement connected to the outer casing and the outer casing itself is in the form of a shell. The resilient tongues may be attached to this shell or stamped in one piece therefrom. When a rolling support device according to the invention is fitted in an opening in a supporting member it is possible as a rule for the rolling support device to be released from the supporting member by levering it out from the opening without damaging the receiving opening such as to make it unusable. To facilitate the extraction in extreme cases there may be provided recesses in the shoulder area, which recesses, when the shoulder area rests against the edge of an opening in the supporting member, enable a releasing tool to gain access to the free ends of the tongues, that is the ends which are remote from the inner pole of the axis of symmetry.

The tongues themselves may be formed of spring strips, it being possible thereby also to provide, in addition to elasticity in the region of the root of the tongue, elasticity in the region of the elbow, which becomes effective when fitted into an opening which is close to the minimum limit.

Various other features and advantages of the present invention will become more clearly apparent from a study of the following description in which reference is made to the accompanying drawings, provided purely by way of non limitative example.

BRIEF DESCRIPTION OF THE DRAWINGS

FIG. 3b is a view in the direction of arrow III of the retaining tongue shown in FIG. 3a.

FIGS. 5, 6 and 7 are partly sectional views of the installation of the rolling support device of the invention in openings of different shape and dimensions.

DESCRIPTION OF THE PREFERRED EMBODIMENTS

Figure 1:
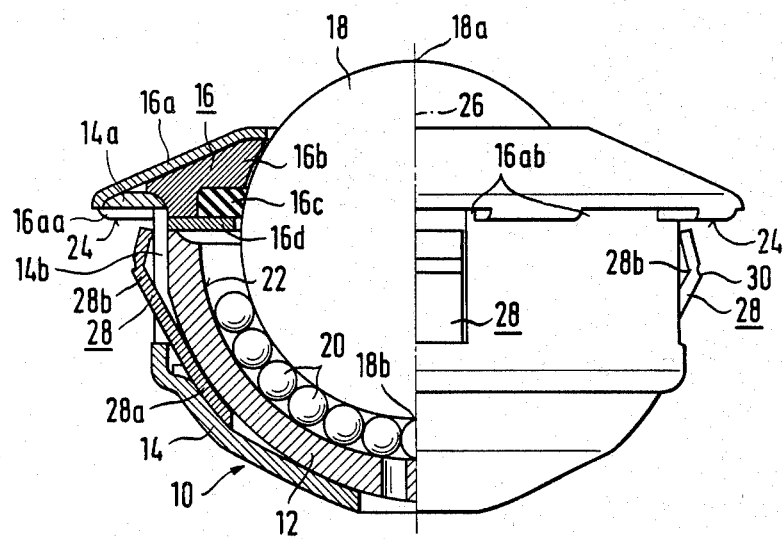
FIG. 1 is a partially sectional side view of a rolling support device formed as an embodiment of the invention.

In the drawings the rolling support device is given the general reference numeral 10. This device comprises a casing assembled from a hemispherical bearing bush 12, an outer casing shell 14 and a retaining ring assembly 16. A main ball 18 is supported in the bearing bush 12 by means of subsidiary bearing balls 20, which roll over an inner surface 22 of the bearing bush 12. The main ball 18 is secured against removal from the casing by the retaining ring assembly 16, which comprises a sheet metal ring 16a, a shaped ring 16b, a sealing ring 16c, and an annular disk 16d. The sheet metal ring 16a is attached to a radial flange 14a of the casing shell 14 by means of flanged lugs 16aa the under surfaces of device is fitted into an opening in a supporting member, overlies the surface in the edge region around the opening.

The rolling support device 10 of the invention has an axis of symmetry 26, and for convenience of description, the axis of symmetry will be considered to have a first or outer pole 18a where it intersects the surface of the main ball 18 at the part of the surface thereof which is exposed for contact with a supported member, and a second or inner pole where it interesects the surface of the ball 18 at the opposite end of the axis of symmetry from the first pole 18a, within the bearing bush 12.

Figure 2A:
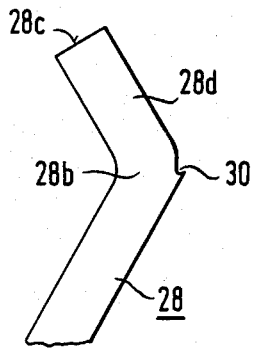
FIGS. 2a, 2b and 2c show the elbow region of various different retaining tongues which may be used in the rolling support device of FIG. 1.

Between the bearing bush 12 and the outer shell 14 of the casing lie the ends 28a of a number of resiliently flexible tongues 28 which each have an elbow portion 28b projecting out through a slot 14b in the outer shell 14. The resilient tongues 28 may be attached to the outer shell 14, for example, by welding, or may be simply trapped by their ends 28a which are situated near the inner pole of the axis of symmetry between the shell 14 and the bearing bush 12. On the outside curve of the elbow portion 28b each resilient tongue is provided with one or more tooth 30 as may be seen from FIGS. 2a, 2b and 2c, from which it will be seen that the end of the resilient tongue 28 remote from the inner pole of the axis of symmetry are designated 28c and the outer face of the limb of the tongue between this end 28c and the elbow 28b itself is indicated with the reference numeral 28d. The ends 28c of the tongues 28 are only a very short distance from the shoulder area 24 so that when the tongues 28 are flexed inwardly, such as by the walls of a narrow opening in a supporting member, the free ends 28c are displaced towards the shoulder 24 to a position where they just reach this shoulder 24 when the tongue 28 is pressed flat into contact with the bearing bush 12. The tooth or teeth 30 of the elbow portion may be formed by stamping or by metal-removing machining of the tongue material.

Figure 3A:
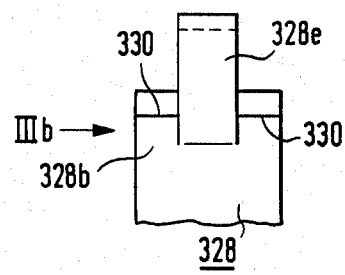
FIG. 3a is a partial view of the elbow region of a further embodiment of a retaining tongue.
Figure 3B:
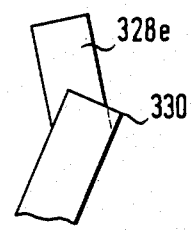

FIGS. 3a and 3b show the elbow portion 328b of an alternative embodiment of a resilient tongue 328. Here two teeth 330 are formed by stamping out the upper limb 328e of the tongue and bending it to form the elbow portion 328b of the tongue and the teeth 330 simultaneously.

Figure 4:
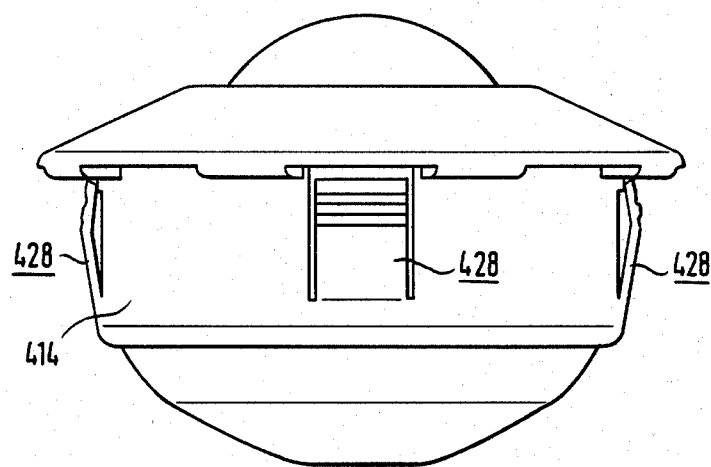
FIG. 4 is a side view of another embodiment of a rolling support device, in which the retaining tongues are formed integrally with a casing shell.

In the embodiment shown in FIG. 4, tongues 428 are formed in one piece with an outer casing shell 414 by being punched therefrom.

Where engagement teeth are mentioned here, this term is to be understood generally as including any type of shaped, friction-increasing elements in the elbow region of the tongues.

Figure 2B:
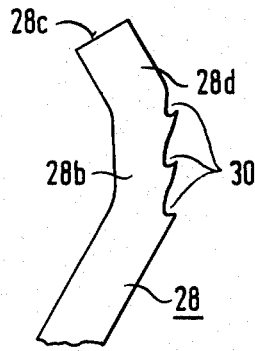
Figure 2C:
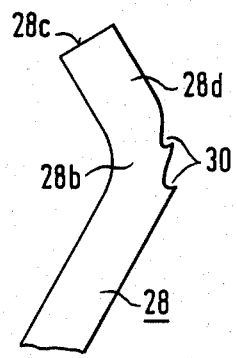

When more than two teeth are provided, these can either be located on a common straight connection piece as shown in FIG. 2b or on a radially outwardly convex arc as shown in FIG. 2c. The embodiments of FIGS. 2b and 2c ensure that at least one of the teeth 30 comes into engagement with the material of the side wall of the opening in the supporting member when the rolling support device is fitted thereto.

If the opening for receiving the rolling support device has a very narrow diameter, this canlead even to flexing of the elbow region 28b after the free end 28c of the tongue has been pressed inwardly into contact with the bearing bush 12.

In principle it is possible to make do with only two diametrically opposed tongues, but it is preferable for there to be more than two, and preferably three or four such tongues distributed evenly around the periphery of the casing.

FIG. 5 shows one example of assembly of the rolling support device in an opening in a supporting member 32 which, in this case, is a relatively thin panel with an inner bore surface 32a: in this case the shoulder 24 rests flat on an edge area 32b of the opening. The edge 32c of the inner bore surface 32a which is remote from the external face of the panel lies against the inclined face of the upper limb 28d of the resilient tongue 28 so that resistance against extraction is achieved initially by the resilient interaction of the limb 28d and the edge 32c. On a further attempt at extraction the tooth 30 engages against the edge 32c. Unintentional removal of the rolling support device from the internal bore 32a is therefore impossible. Should it be desired deliberately to remove the rolling support device from the internal bore 32a for the purpose of maintenance or exchange, it is possible to do so with a correspondingly great use of force, without the internal bore 32a being destroyed. Dismantling can be effected by the insertion of a pointed instrument through the recesses 16ab formed in the shoulder area 24 between the lugs 16aa which instrument is then used to press the resilient tongues 28 radially inwards to release the teeth 30 from the edge 32a. The individual resilient tongues can thus be levered out one after the other, resulting in the rolling support device being tilted as it is removed.

FIG. 6 shows an example of assembly of the rolling support device as an opening in a thick supporting member 132; security here is ensured exclusively by the tooth 30 being in engagement with the internal bore 132a. Assembly is effected, as in the case of FIG. 5, simply by pressing the rolling support device straight into the internal bore 132a. Dismantling can be effected as described in relation to FIG. 5.

FIG. 7 shows an example of assembly which differs from that of FIG. 6 merely in that the internal bore 232a has a greater diameter than in the case of FIG. 6, this being compensated by the spring characteristics of the resilient tongue 28.

What is claimed is:

1. A rolling support device comprising:
   a main ball for rolling engagement with a ball engagement face,
   a casing within which said main ball is rollingly housed,
   means retaining said main ball within said casing with a portion of said ball exposed to make rolling contact with said ball engagement face,
   said rolling support device being substantially symmetrical about an axis of symmetry having an outer pole where it intersects said exposed portion of said main ball and an inner pole where it intersects said surface of said main ball diametrically opposite said outer pole,
   means defining a first casing part shaped for insertion into an opening in a supporting member, said supporting member having a front face and said opening extending from said front face into said supporting member in a direction perpendicular to said front face,
   means defining a shoulder portion of said casing surrounding said first casing part and having a shoulder face facing away from said outer pole of said axis of symmetry whereby to contact an edge area of said front face surrounding said opening in said supporting member when said first casing part is inserted therein,
   resilient tongues projecting from said first casing part toward said shoulder face for engagement with an internal circumferential side wall of said opening in said supporting member when said first casing part is inserted therein,
   said resilient tongues have a first limb portion axially remote from said shoulder face and having increasing radial distance from said axis of symmetry with decreasing axial distance from said shoulder face, and a second limb portion axially adjacent to said shoulder face and having a decreasing radial distance from said axis of symmetry with decreasing distance from said shoulder face, an elbow portion being provided between said first limb portion and said second limb portion, said elbow portion being directed radially outwardly of said first casing part with respect to said axis of symmetry,
   means securing said first limb portions of said resilient tongues to said casing,
   said elbow portion having an apex, said apex having a predetermined axial distance from said shoulder face,
   tooth means being provided on said elbow portion of each said resilient tongue,
   substantially smooth faces of said second limb portions of said resilient tongues being engageable with said internal circumferential side wall when said first casing part is inserted into said opening in said supporting member, and when said supporting member is plate-shaped and has a thickness smaller than said predetermined axial distance,
   said tooth means being engageable with said internal circumferential side wall when said first casing part is inserted into said opening of said supporting member, which opening has a depth perpendicular to said front face, and when said depth is larger than said predetermined axial distance.

2. The rolling support device of claim 1, wherein said tooth means of said elbow portion of said resilient tongues is shaped such that it offers less resistance to insertion into a said opening in a said supporting member than to removal therefrom.

3. The rolling support device of claim 1, wherein the ends of said second limb portions of said tongues which are remote from said inner pole of said axis of symmetry of said device reach substantially as far as said shoulder face of said casing when said tongues are resiliently flexed as far as possible upon insertion of said device into said opening in said supporting member.

4. The rolling support device of claim 1, wherein said tooth means on said elbow portions of said tongues are formed by stamping the material of said tongues.

5. The rolling support device of claim 1, wherein said tooth means are formed by stamping out and bending an end limb portion of said tongues.

6. The rolling support device of claim 1, wherein said first casing part has respective receiving slots therein for receiving respective said tongues upon flexure thereof towards said axis of symmetry.

7. The rolling support device of claim 1, wherein said first part of said casing comprises:
   a substantially hemispherical bearing bush, and
   an outer shell surrounding said bearing bush;
   a second part of said casing comprising a retaining ring assembly,
   means connecting said retaining ring assembly to said outer shell whereby to retain said main ball in said bearing bush, and
   means securing said tongues to said outer shell.

8. The rolling support device of claim 1, wherein said first part of said casing comprises:
   a substantially hemispherical bearing bush, and
   an outer shell surrounding said bearing bush, said tongues being integrally formed with said outer shell;
   a second part of said casing comprising a retaining ring assembly, and
   means connecting said retaining ring assembly to said outer shell whereby to retain said bearing ball in said bearing bush.

9. The rolling support device of claim 3, wherein there are provided recesses in said shoulder means, said recesses allowing access to said free ends of said tongues by a releasing tool when said shoulder means rests against the edge area of a said opening in a said supporting member.

10. The rolling support device of claim 1, wherein said tongues are formed by spring strips.

11. A rolling support device as claimed in claim 1, said first casing part comprising a substantially hemispherical bearing bush (12), an outer shell (14) surrounding said bearing bush (12), said outer shell (14)

being provided with a radially outwardly directed annular flange (14a), said retaining means comprising a sheet metal ring (16a), said sheet metal ring (16a) being located on a side of said flange (14a) remote from said inner pole, said sheet metal ring (16a) being provided with lugs (16aa), said lugs (16aa) being bent around a radially outer edge of said flange (14a) and being applied to a further face of said flange (14a), which further face is remote from said outer pole, said lugs (16aa) defining said shoulder face (24), recesses (16ab) being provided between subsequent lugs (16aa), said recesses (16ab) registering with said resilient tongues (28) in axial direction.

12. A rolling supporting device as claimed in claim 1, said second limb portion (328e) of said resilient tongues (328) being smaller in circumferential direction about said axis of symmetry than said first limb portion, said second limb portion (328e) being stamped free of said first limb portion by cut lines extending into said first limb portion from the end of said first limb portion, which end is nearer to said shoulder face, said cut lines defining circumferentially spaced longitudinal edges of said second limb portion (328e) in teh area of said elbow portion, said second limb portion (328e) being bent about a bending line with respect to the respective first limb portion, which bending line is tangential with respect to said axis of symmetry and is provided adjacent to the inner ends of said cut lines within said first limb portion, the terminal edges of said first limb portion on both circumferential sides of said second limb portion (328e) defining said tooth means (330).

13. A rolling device as claimed in claim 11, said resilient tongues being received by slots (14b) of said outer shell.

14. A rolling device as claimed in claim 11, said recesses (16ab) permitting the introduction of a tongue releasing tool engaging said second limb portion when said first casing part is inserted into said opening, and said shoulder face (24) is engaging said edge area of said front face.

15. A rolling support device mounted in a supporting member having a front face and an opening extending from said front face into said supporting member in a direction perpendicular to said front face, comprising:
   a main ball for rolling engagement with a ball engagement face,
   a casing within which said main ball is rollingly housed,
   means retaining said main ball within said casing with a portion of said ball exposed to make rolling contact with said ball engagement face,
   said rolling support device being substantially symmetrical about an axis of symmetry having an outer pole where it intersects said exposed portion of said main ball and an inner pole where it intersects said surface of said main ball diametrically opposite said outer pole,
   means defining a first casing part shaped for insertion into said opening of said supporting member,
   means defining a shoulder portion of said casing surrounding said first casing part and having a shoulder face facing away from said outer pole of said axis of symmetry whereby to contact an edge area of said front face surrounding said opening in said supporting member, and
   resilient tongues projecting from said first casing part towards said shoulder face for engagement with an internal circumferential side wall of said opening in said supporting member,
   said resilient tongues projecting from said first casing part towards said shoulder face for engagement with an internal circumferential side wall of said opening in said supporting member,
   said resilient tongues having a first limb portion axially remote from said shoulder portion and having increasing radial distance from said axis of symmetry with decreasing axial distance from said shoulder face, a second limb portion axially adjacent to said shoulder portion and having decreasing radial distance from said axis of symmetry with decreasing axial distance from said shoulder face, an elbow portion being provided between said first limb portion and said portion being provided between said first limb portion and said second limb portion, said elbow portion being directed radially outwardly of said first casing part with respect to said axis of symmetry,
   means securing said first limb portions of said resilient tongues to said casing,
   said elbow portion having an apex, said apex having a predetermined axial distance from said shoulder face, said opening having a depth perpendicular to said front face, said depth being larger than said predetermined axial distance,
   tooth means being provided on said elbow portion of each said resilient tongue, said tooth means engaging said internal circumferential side wall of said opening in said supporting member when said first casing part is introduced therein.

* * * * *